(12) United States Patent
Lee

(10) Patent No.: US 7,459,232 B2
(45) Date of Patent: Dec. 2, 2008

(54) SECONDARY BATTERY HAVING SAFETY VALVE AND METHOD OF MANUFACTURING SAME

(75) Inventor: Jin-Uk Lee, Asan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 540 days.

(21) Appl. No.: 10/872,019

(22) Filed: Jun. 16, 2004

(65) Prior Publication Data

US 2004/0258989 A1 Dec. 23, 2004

(30) Foreign Application Priority Data

Jun. 19, 2003 (KR) ...................... 10-2003-0039959

(51) Int. Cl.
*H01M 2/12* (2006.01)
(52) U.S. Cl. ......................... 429/56; 429/185
(58) Field of Classification Search ........................ None
See application file for complete search history.

(56) References Cited

U.S. PATENT DOCUMENTS

| | | | | |
|---|---|---|---|---|
| 4,079,172 | A | * | 3/1978 | Potts et al. ..................... 429/54 |
| 4,255,499 | A | * | 3/1981 | Beatty .......................... 429/54 |
| 4,842,965 | A | * | 6/1989 | Urushiwara et al. ............ 429/56 |
| 4,957,827 | A | * | 9/1990 | Kordesch et al. .............. 429/60 |
| 6,335,114 | B1 | * | 1/2002 | Ueshima et al. ............... 429/94 |
| 6,805,992 | B1 | * | 10/2004 | Hanafusa et al. .............. 429/56 |
| 7,163,766 | B2 | * | 1/2007 | Anglin et al. ................ 429/229 |

FOREIGN PATENT DOCUMENTS

| | | |
|---|---|---|
| JP | 9-259842 | 10/1997 |
| JP | 2000-021361 | 1/2000 |
| JP | 2001-43845 | 2/2001 |
| JP | 2001-155698 | 6/2001 |
| JP | 2001-307705 | 11/2001 |
| JP | 2002-523875 T | 7/2002 |
| JP | 2002-2988224 | 10/2002 |
| JP | 2003-17029 | 1/2003 |
| JP | 2003-051293 | 2/2003 |
| JP | 2003-346742 | 12/2003 |
| KR | 10-2000-0019214 | 4/2000 |
| KR | 10-2003-0031285 | 4/2003 |

OTHER PUBLICATIONS

Korean Patent Abstract, Publication No. 1020000019214 A, Published Apr. 2000.
Korean Patent Abstract, Publication No. 1020030031285 A, Published Apr. 21, 2003.

(Continued)

*Primary Examiner*—Jonathan Crepeau
(74) *Attorney, Agent, or Firm*—Christie, Parker & Hale, LLP

(57) ABSTRACT

An electrode assembly includes a positive plate, a negative plate and a separating plate interposed between those two plates, a container receiving the electrode assembly inside thereof, a cap plate fixed onto an opening of the container to seal the container, and a safety valve formed on the region where the container and the cap plate are joined.

1 Claim, 4 Drawing Sheets

OTHER PUBLICATIONS

Patent Abstracts of Japan, Publication No. 09-259842, dated Oct. 3, 1997, in the name of Takashi Kakiuchi.
Patent Abstracts of Japan, Publication No. 2001-043845, dated Feb. 16, 2001, in the name of Hideaki Nagura et al.
Patent Abstracts of Japan, Publication No. 2001-155698, dated Jun. 8, 2001, in the name of Takayuki Endo.
Patent Abstracts of Japan, Publication No. 2003-346742, dated Dec. 5, 2003, in the name of Hiroshi Tasai.
Patent Abstracts of Japan, Publication No. 2001-307705, dated Nov. 2, 2001, in the name of Masanori Kogure.
Patent Abstracts of Japan, Publication No. 2003-017029, dated Jan. 17, 2003, in the name of Yasuhiro Yamauchi.

* cited by examiner

SECONDARY BATTERY HAVING SAFETY VALVE AND METHOD OF MANUFACTURING SAME

CROSS-REFERENCE TO RELATED APPLICATION

This application claims priority to and benefit of Korean Patent Application No. 2003-39959 filed on Jun. 19, 2003 in the Korean Intellectual Property Office, the entire disclosure of which is incorporated herein by reference.

BACKGROUND (a) Field

The present invention relates to a secondary battery, and more particularly, to a structure of a safety valve in a secondary battery.

(b) Description of the Related Art

A secondary battery is a rechargeable battery that can be made into a smaller size or a larger size. Common types of secondary batteries include the nickel-hydrogen battery, the lithium battery and the lithium-ion battery. Depending on the external shapes, they may be classified into cylindrical type batteries and square type batteries (e.g., square shaped or rectangular shaped).

Generally, the secondary battery includes a power generating element, that is, an electrode assembly having a positive plate, a negative plate and a separating plate, and a metal container receiving the electrode assembly and electrolyte, and a cap assembly fixed onto the opening of the container to seal the container.

Depending on the structure of the secondary battery, the cap assembly can be made in various forms, one of which has a cap plate welded onto the opening of the container to seal the container, a terminal pin, and a gasket insulating the cap plate from the terminal pin.

The terminal pin is welded onto a negative tap that is drawn out from the negative plate so that the terminal pin functions as a negative terminal.

Furthermore, a positive tap drawn out from the positive plate is electrically connected directly to the bottom of the cap plate or to the inner wall of the container to make the whole outside of the battery except the terminal pin function as a positive terminal.

Meanwhile, a secondary battery has a safety valve in order to prevent the battery from exploding by reducing the internal pressure when gases are generated in the battery and the internal pressure increases to a level higher than a prescribed level.

A conventional safety valve is either formed as an integrated structure of the cap plate or the container through mechanical, etching or electroforming process, or formed as a separate structure attached on the cap plate or the container.

Therefore, conventionally a safety valve must be provided separately to a secondary battery for its safety, and consequently it is necessary to add more process and equipment, which reduces the productivity (increase of complexity of process and manufacturing costs) of a secondary battery.

SUMMARY

In one embodiment of the present invention, a secondary battery is provided having a safety valve that is formed without a separate additional process. In another embodiment, a method of manufacturing a secondary battery is provided having a safety valve that is formed without a separate additional process.

In another embodiment, a secondary battery having an electrode assembly includes a positive plate, a negative plate and a separating plate interposed between those two plates, a container receiving the electrode assembly inside thereof, a cap plate fixed to an opening of the container to seal the container, and a safety valve formed on the region where the container and the cap plate are joined.

In this embodiment, the container and the cap plate are joined by welding, and the safety valve is formed on a sealing part where the container and the cap plate are sealed. The sealing part includes a first sealing part formed with a certain welding strength, and a second sealing part formed with a weaker welding strength than the first sealing part. The second sealing part forms the safety valve.

The sealing part includes a pair of long edges and a pair of short edges, and the safety valve can be formed on at least one of the long edges, and is formed with a length that is equal to or less than 30% of L, where L is the whole length of the long edge. Also, a length (l) can be formed to be 5 mm and 20 mm, where the length (l) is the length of the safety valve.

In one embodiment, the sealing part includes a pair of long edges and a pair of short edges, and the safety valve can be formed on at least one of the short edges. In another embodiment, the safety valve can be formed on the corners that are formed between the long edges and the short edges.

The container may be formed in a square or a cylindrical shape.

Also, a method of manufacturing a secondary battery according to one embodiment of the present invention includes a method of manufacturing a square secondary battery having a safety valve that is to be exploded to reduce the internal pressure when the internal pressure of the battery reaches a level higher than a predetermined level. A low sealing part functions as the safety valve by forming the low sealing part on a portion of a sealing part with a weaker welding strength than the other portion. The welding strength can be controlled when the sealing part is formed by welding a cap plate onto an opening of a square shaped container.

Also, a method of manufacturing a secondary battery according to another embodiment of the present invention includes a method of manufacturing a cylindrical secondary battery having a safety valve that is to be exploded to reduce the internal pressure when the internal pressure of the battery reaches a level higher than a predetermined level. A low sealing part functions as the safety valve by forming the low sealing part on a portion of the sealing part with a weaker crimping strength than the other portion. The crimping strength can be controlled when the sealing part is formed by crimping a cap plate onto an opening of a cylinder shaped container.

DETAILED DESCRIPTION OF THE EMBODIMENTS

Exemplary embodiments of the present invention will now be described in detail with reference to the accompanying drawings.

Figure 1:
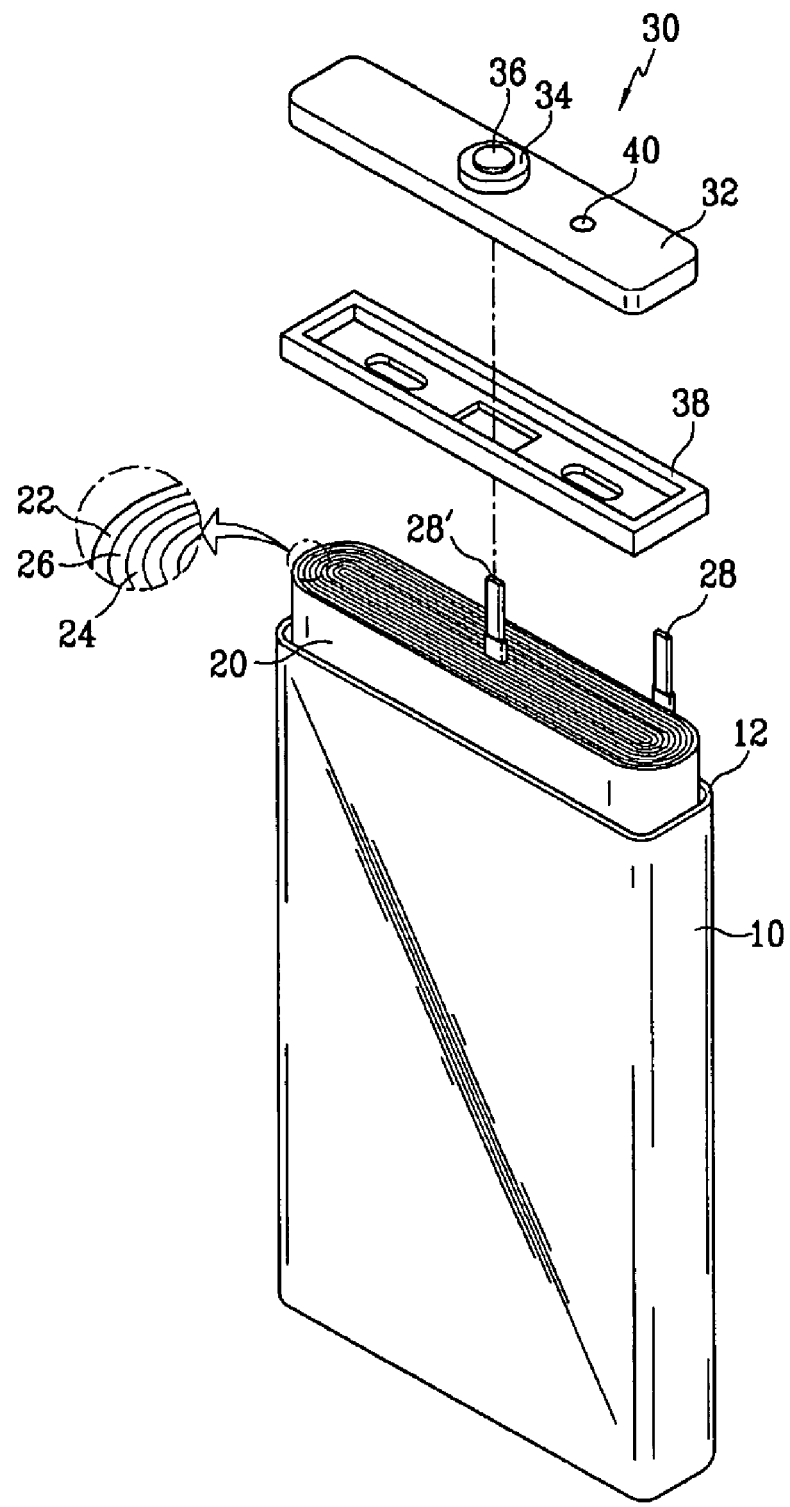
FIG. 1 is a partial exploded perspective view of a secondary battery according to the first embodiment of the present invention.
Figure 2:
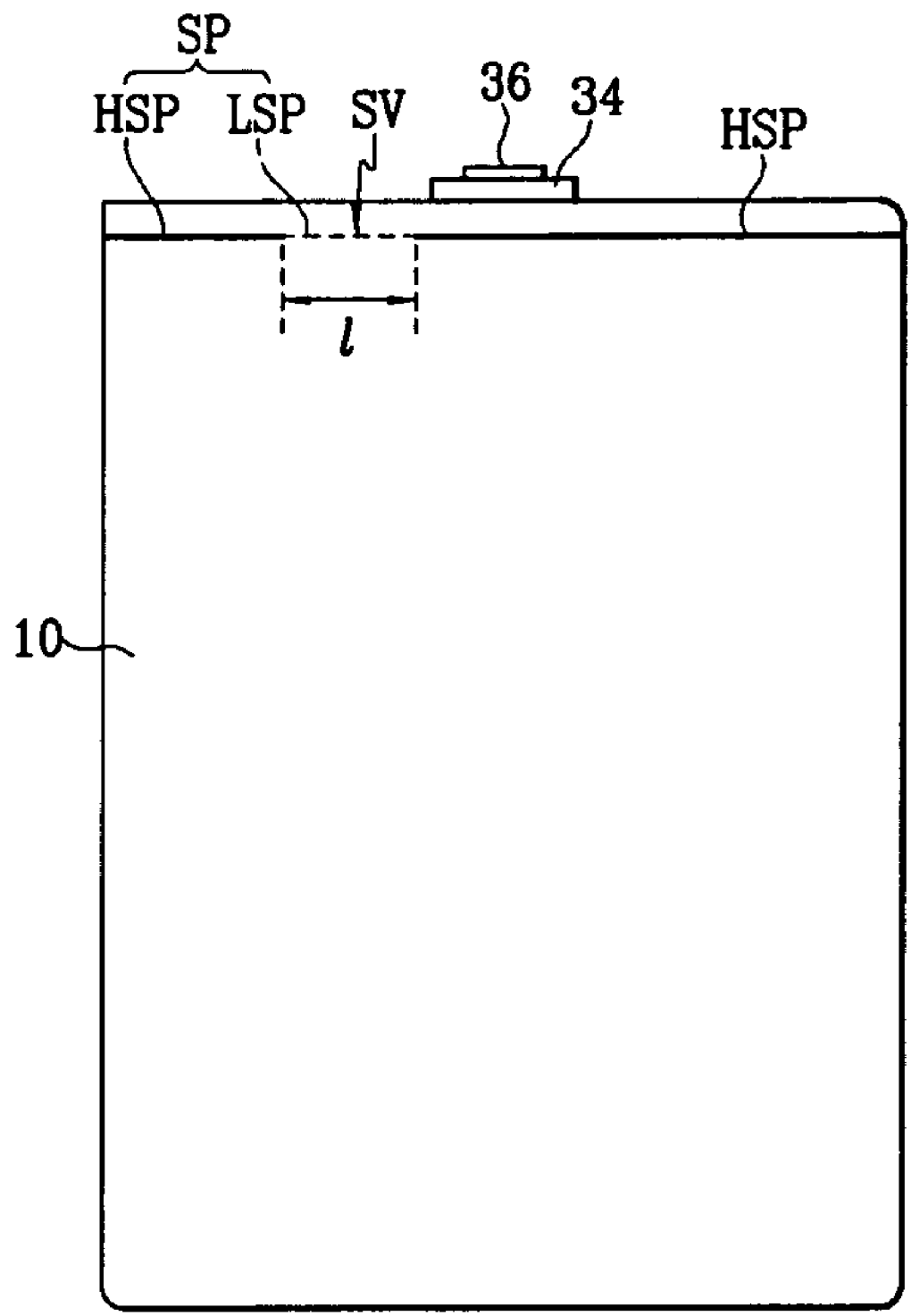
FIG. 2 is a front view of a secondary battery according to the first embodiment of the present invention.

FIG. 1 is a partial exploded perspective view of a secondary battery according to the first embodiment of the present invention, and FIG. 2 is a side view of the FIG. 1 in an assembled form.

Referring to the drawings, a secondary battery according to an embodiment of the present invention includes a container 10 with an opening 12 on one side, an electrode assembly 20 that is inserted into the container 10 through the opening 12, and a cap assembly 30 fixed to the opening 12 of the container 10 to seal the container 10.

The electrode assembly 20 is formed with a positive plate 22, a negative plate 24 and a separating plate 26. According to an exemplary embodiment of the present invention, as shown in FIG. 1, the electrode assembly 20 in a form of a jelly roll can be used that is formed by stacking and winding the positive plate 22, the negative plate 24 and the separating plate 26.

The negative plate 24 includes a negative collector of a thin metal plate in a strip form, and a thin copper plate can be used as the negative collector. On at least one side of the negative collector is formed a negative coating portion that is coated with a negative metal composite comprised of a negative active material.

Also, the positive plate 22 includes a positive collector of a thin metal plate in a strip form, e.g., a thin aluminum plate. On at least one side of the positive collector is formed a positive coating portion that is coated with a positive metal composite with a positive active material.

On the upper part of the electrode assembly 20 are drawn out a positive tap 28 and a negative tap 28' that are electrically connected to the positive plate 22 and the negative plate 24 respectively. A thin nickel plate can be used as a negative tap 28', and a thin aluminum plate can be used as a positive tap 28, but are not limited thereto. The positive tap 28 and the negative plate 28' can be arranged in an opposite way to that in FIG. 1.

Meanwhile, the container 10 can be made of a metallic material with a shape of an approximate hexahedron, and so the container, itself, can function as a terminal. According to an embodiment of the present invention the container 10 can be made of aluminum or aluminum alloy that is light and conductive metal. Also, the container 10 has an opening 12 on one side, through which the opening the electrode assembly 20 can be inserted into the container 10.

The container 10 can be formed in a square shape the corners of which are angled. Although it is not shown in the drawing, the angled corners can also be formed in a rounded shape.

The cap assembly 30 is placed on the opening 12 of the container 10 to seal the container 10, and the cap assembly 30 has a cap plate 32 that is welded directly onto the opening 12 of the container 10. The container 10 and the cap plate 32 can be made of the same metallic material to make the welding easier.

The cap assembly 30 has a terminal pin 36 which goes through the cap plate 32 while insulated by the gasket 34. An insulating plate and a terminal plate (not shown in the drawing) are added on the lower part of the terminal pin 36 to insulate the terminal pin 36 from the cap plate 32. The negative tap 28' is welded onto the lower part of the terminal pin 36 so that the terminal pin 36 can function as a negative terminal.

Meanwhile, the positive tap 28 that is drawn out of the positive plate 22 is connected electrically directly to the bottom of the cap plate 32 or to the inside of the container 10, and thereby, the outside of the whole battery except the terminal pin 36 can function as a positive terminal.

However, the structure of the positive terminal and negative terminal is not limited only to that explained above, and the structure of the positive terminal, like the structure of the negative terminal, can be formed through a separate terminal pin. Also, other structures can be applied thereto.

After the electrode assembly 20 is inserted into a container 10, a protection case 38 made of an insulating material can be placed between the electrode assembly 20 and the cap assembly 30 to fix the electrode assembly 20 more firmly.

Furthermore, after welding the cap assembly 30 onto the opening 12 of the container 10, electrolyte is injected through an electrolyte injection hole 40 on the cap plate 32, and then it is sealed with a plug (not shown in the drawing).

For the square secondary battery with the above described structure, the cap plate 32 is welded onto a portion of the container 10 around the opening 12 by the seam welding method, and in an embodiment of the present invention, a sealing part (SP), i.e., the welded portion between the cap plate 32 and the container 10, that comprises a first sealing part of a high sealing part (HSP) with a certain predetermined welding strength, and a second sealing part of a low sealing part (LSP) with a less welding strength than the first sealing part.

In order to differentiate clearly the high sealing part (HSP) and the low sealing part (LSP) in FIG. 2, the HSP is marked with a solid line and the LSP is marked with a dotted line.

The low sealing part (LSP) functions as a safety valve (SV) that is to explode to reduce the internal pressure in the container 10 when the internal pressure increases at a level higher than a prescribed level.

Accordingly, the low sealing part (LSP) of this embodiment of the present invention is formed with such a welding strength that the low sealing part explodes when the gas pressure reaches a level higher than 12 kgf/cm$^2$.

Also, the high sealing part (HSP) is formed with such welding strength that the high sealing part withstands a pressure of around 20 kgf/cm$^2$ as an ordinary situation.

Formation of such a sealing part (SP) can be achieved by welding the cap plate 32 onto the opening 12 of the container 10 with a lower welding strength by controlling the welding strength on a certain region (the region of the low sealing part).

Figure 3:
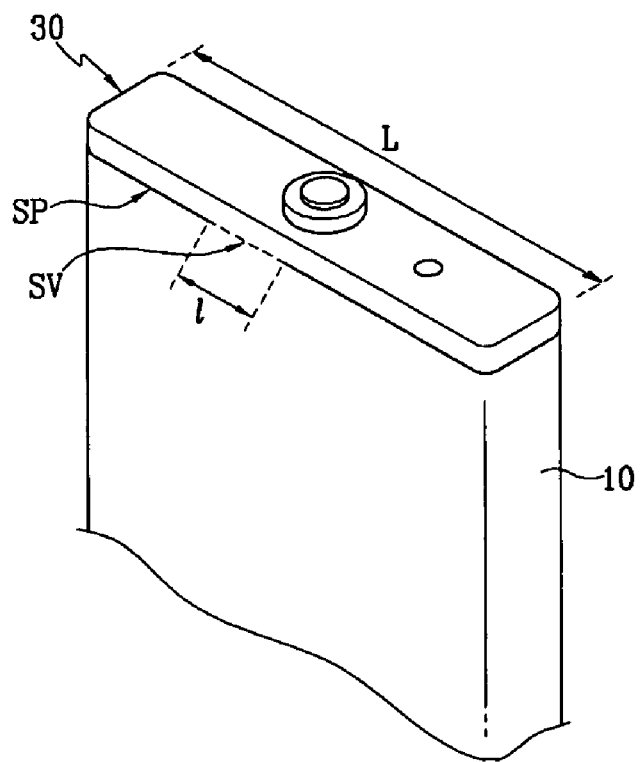
FIG. 3 is a partial perspective view illustrating a sealing part of a secondary battery according to the first embodiment of the present invention.

The safety valve (SV) of this embodiment of the present invention, as shown in FIG. 3, can be formed on at least one of the long edges when the sealing part (SP) is formed with a combination of a pair of long edges and a pair of short edges.

In this case, when the length of a long edge is L, a length (l) of the safety valve is to be less than 30% of L. In detail, the length (l) is to be less than 1 cm, preferably to be formed within the range of 0.1 to 10 mm.

Figure 4:
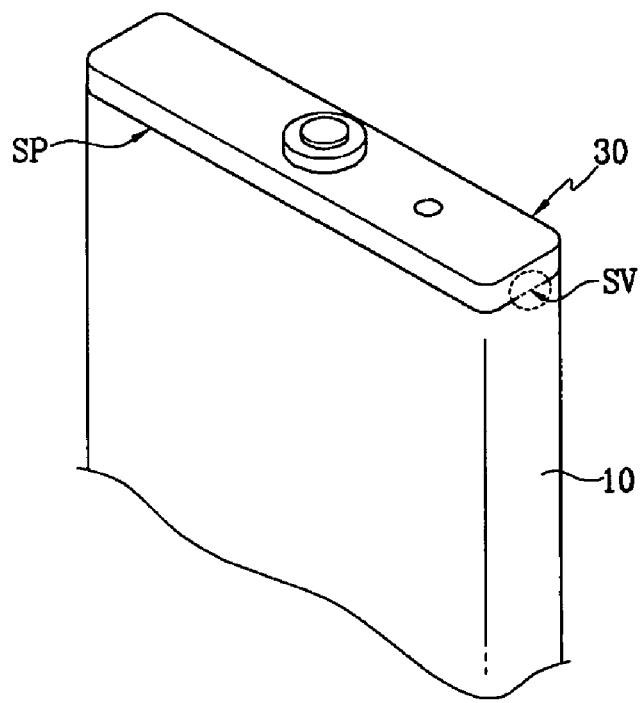
FIG. 4 is a partial perspective view illustrating a sealing part according to another embodiment of the present invention.
Figure 5:
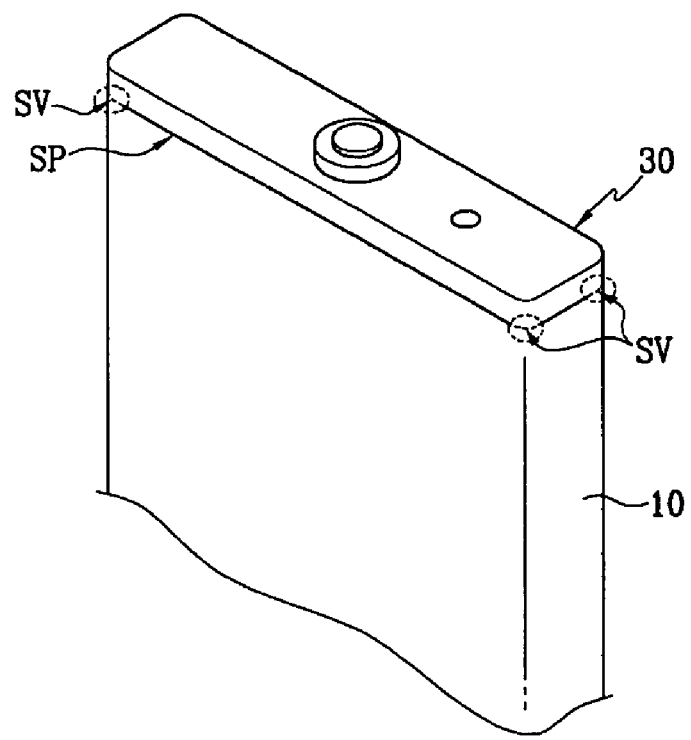
FIG. 5 is a partial perspective view illustrating a searling part according to yet another embodiment of the present invention.

FIG. 4 and FIG. 5 are modified examples of the embodiment previously described. FIG. 4 is an example where the safety valve is formed on at least one of the short edges of the sealing part (SP), and FIG. 5 is an example where the safety valve is formed on the corners of the sealing part (SP).

Up to now, the examples have been explained where the safety valve (SV) is formed with the low sealing part (LSP) by a welding process. However, in another embodiment of a secondary battery in a cylindrical shape that is made by a crimping process to seal the cap plate and the container, the low sealing part can be formed by controlling the crimping strength process.

Figure 6:
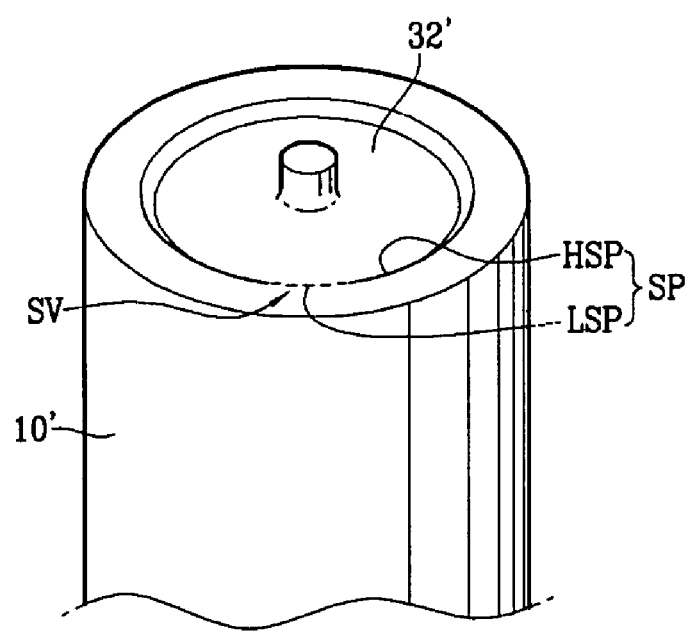
FIG. 6 is a partial perspective view illustrating a secondary battery according to still yet another embodiment of the present invention.

FIG. 6 is a partial perspective view of a secondary battery in a cylindrical shape according to another embodiment of the present invention.

In the secondary battery in a cylindrical shape, a cap plate 32' and a r container 10' in a cylindrical shape is normally sealed by a crimping process. The secondary battery of the embodiment of the present invention has a low sealing part (LSP) that is crimped with a lower crimping strength on a certain region than the other region of the sealing part where the cap plate 32' and the container 10' are sealed. The HSP is a high sealing part that is crimped with a higher crimping strength than the low sealing part (LSP).

Consequently, when the internal pressure increases at a level higher than a prescribed level, for example 12 kgf/cm$^2$, the low sealing part (LSP) functioning as a safety valve explodes, and thereby the internal pressure is reduced to prevent the battery from exploding.

Also, according to another embodiment of the present invention, by controlling the welding strength or the crimping strength on the low sealing part that functions as a safety valve at a desired level, an effect can be attained to set the operating pressure more easily and more precisely.

As explained above, because the present invention can form a safety valve without an additional separate step for the sealing process of a cap plate and a container, a simpler manufacturing process and manufacturing cost saving can be realized.

Although embodiments of the present invention have been described in detail hereinabove in connection with certain exemplary embodiments, it should be understood that the invention is not limited to the disclosed exemplary embodiment, but, on the contrary is intended to cover various modifications and/or equivalent arrangements included within the spirit and scope of the present invention, as defined in the appended claims.

What is claimed is:

1. A secondary battery, comprising:
    an electrode assembly including a positive plate, a negative plate and a separating plate interposed between the positive plate and the negative plate;
    a cylindrical container having an opening for receiving the electrode assembly inside the container;
    a cap plate crimped to the opening of the container to seal the container; and
    a safety valve formed on the region where the container and the cap plate are crimped,
    wherein the safety valve is formed on a sealing part where a top peripheral edge of the container defining the opening is curled on and contacts the entire circumference of the cap plate, the sealing part including a first sealing part formed with a predetermined crimping strength and a second sealing part formed with a weaker crimping strength than the first sealing part, the second sealing part forming the safety valve.

* * * * *